Figure 1:
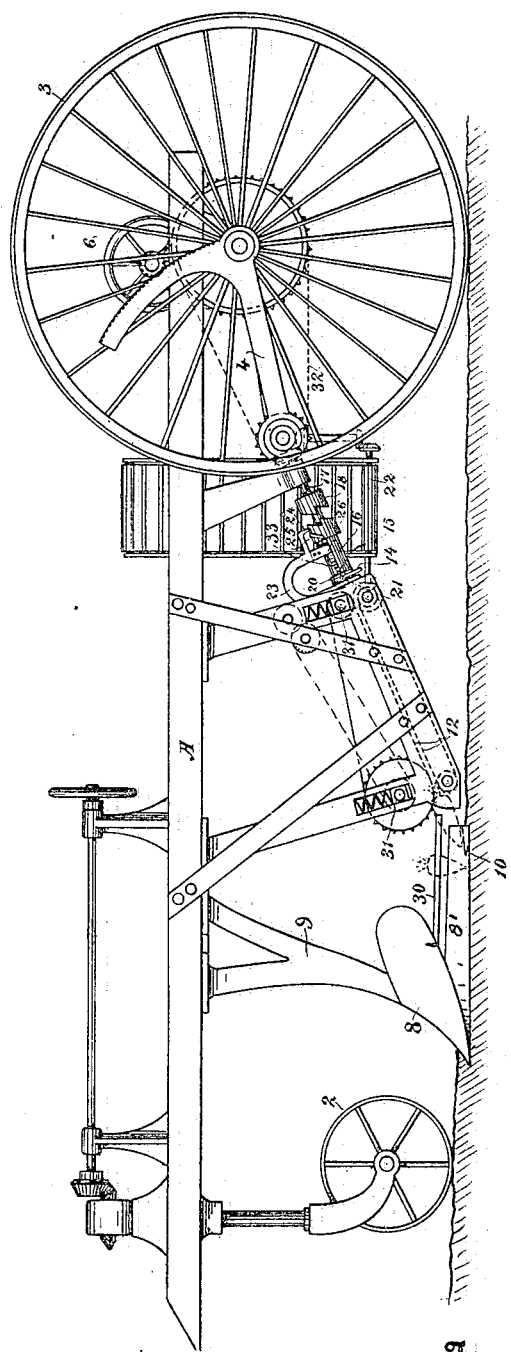

No. 809,694. PATENTED JAN. 9, 1906.
C. L. JOLLY.
BEET HARVESTER.
APPLICATION FILED MAY 31, 1900.

2 SHEETS—SHEET 1.

Witnesses,

Inventor
Charles L. Jolly
Dewey Strong & Co.
atty.

No. 809,694. PATENTED JAN. 9, 1906.
C. L. JOLLY.
BEET HARVESTER.
APPLICATION FILED MAY 31, 1900.
2 SHEETS—SHEET 2.
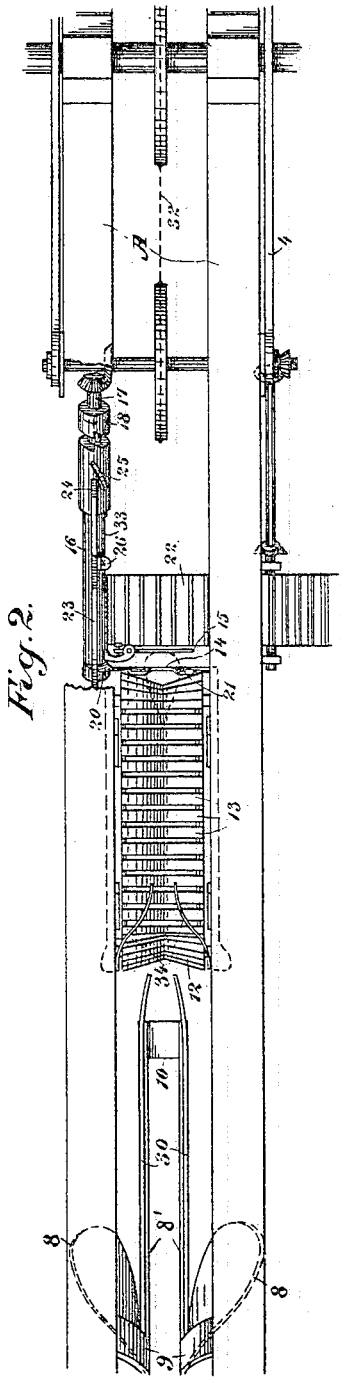
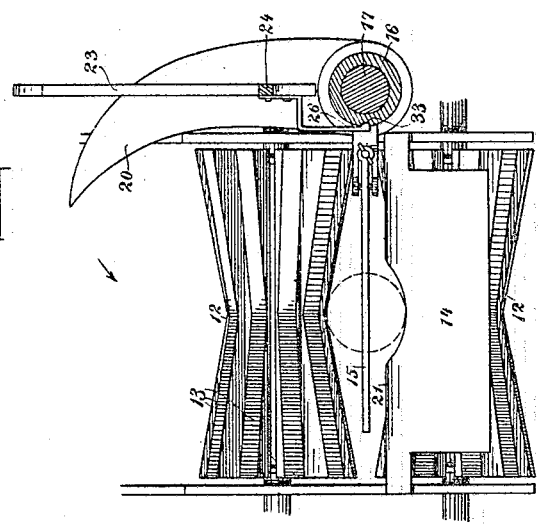
Witnesses:
Inventor
Charles L. Jolly

UNITED STATES PATENT OFFICE.

CHARLES L. JOLLY, OF SALINAS, CALIFORNIA, ASSIGNOR OF ONE-THIRD TO STANSFIELD SHERWOOD, OF SALINAS, CALIFORNIA.

BEET-HARVESTER.

No. 809,694.     Specification of Letters Patent.     Patented Jan. 9, 1906.

Application filed May 31, 1900. Serial No. 18,537.

*To all whom it may concern:*

Be it known that I, CHARLES L. JOLLY, a citizen of the United States, residing at Salinas, county of Monterey, State of California, have invented an Improvement in Beet-Harvesters; and I hereby declare the following to be a full, clear, and exact description of the same.

My invention relates to an apparatus which is especially designed for the harvesting of beets and similar root crops.

It consists of a wheeled vehicle, with means for raising and lowering, plows carried on the front of the vehicle and so designed as to turn the earth upon each side of the row of beets, and a lifting plow or blade traveling in the rear of the leaders by which the beets are lifted out of the ground. From this lifting device the beets are carried upwardly between endless traveling belts and are so placed that a knife set into operation by proper mechanism will cut off the tops of the beets, while the latter are transferred to a draper or carrier and by it delivered into a wagon which moves by the side of the apparatus to receive them, so that without handling the beets are in readiness to be carried to the factory or point of storage.

It also consists of the parts and the constructions and combinations of parts hereinafter described and claimed.

In the accompanying drawings, Figure 1 is a side view of the harvester. Fig. 2 is a plan view of the same. Fig. 3 is an end view of the beet-head-severing device.

The object of my invention is to extricate the beets from the ground, cut off the tops, and transfer the beets to vehicles in a single continuous operation.

In the drawings, A is a framework of any suitable description, the front end of which is mounted upon a steering-wheel 2, with means for turning, raising, and lowering it, and suitable devices (not here shown) by which a team or other means of traction can be attached. The rear end of the machine is supported upon wheels 3, separated so as to travel between the rows of beets. A lever 4, fulcrumed from the wheel-shaft, raises and lowers the rear end of the frame A by means of a toothed rack and revoluble pinion 6. The plows may be thus raised or lowered to suit requirements.

8 represents two plows mounted upon standards 9, connected with the beam A, and these plows are designed to travel upon each side of the row of beets, the shares being so contrived as to throw the dirt outwardly and expose the beets in the row, but without throwing the dirt so far as to cover the next adjacent rows.

10 is a lifting blade or share (shown in Fig. 1 as inclined) which is disposed between the extreme ends of the landsides 8' of the plows 8, so that it will pass beneath the exposed beets and lift them out of the ground and cut off the long tap-roots. The beets thus lifted are received between parallel rods or bars 30, which hold them in an upright position and guide them to the rear, where they are delivered upon the belt by which they are transmitted to the knife by which the tops are severed.

12 represents endless traveling belts passing around suitably-disposed drums, and the beets lifted by the share 10 are delivered between these belts. The belts are made of leather or other flexible material and may have transverse wooden, rubber, or other ribs 13 extending between them, and between these ribs the body of the beet is received and carried upward to the upper end, where the belts separate in passing around the upper drums or rollers. The transverse ribs 13 have preferably concave faces presented toward each other, which act to hold the beets in the center as they move upward. The drums of the upper belt have movable spring-pressed journal-boxes 31 and can thus yield to accommodate any size of beet which may be presented. Elastic arms 34 converge from opposite sides between the belts and serve to guide and center the beets upon the belt. At the upper end of the carrier-belts the head of each beet passes over a plate 14, and as it reaches this point it strikes an arm or lever 15, which is attached to a sleeve 16. This sleeve is slidable upon a rotary shaft 17, and the upper end of the sleeve 16 is formed into teeth of a clutch member, as shown. The other part of the clutch is fixed to the shaft 17, as shown at 18, and this part of the clutch revolves continually with the shaft, motion being transmitted to revolve the shaft 17 by any suitable gear or other connection, such as a chain 32 on sprocket-wheels, from the main bearing-wheel shafts, so as to rotate the shaft 17.

When by the movement of the lever 15 the sleeve 16 is caused to slide up on the shaft 17 until its toothed upper end engages with the corresponding teeth 18 of the other member of the clutch, the revolution of the shaft 17 will immediately revolve the sleeve 16. This sleeve carries a knife or cutter 20, and this cutter is also guided as it moves by an incline 21, so that as it passes down over the edge of the plate 14, on which the incline 21 is formed, with a shearing motion it severs the top of the beet, which falls to the ground over the head of the lower belt 12. The beet itself is carried over and falls upon a draper or carrying-belt 22, and by this it is delivered at one side of the machine, falling into a wagon or other receptacle prepared for it and which travels along with the harvesting apparatus. The knife sweeps around, passing through the yoke 23 on one side of the apparatus, and is returned to its normal position, and it comes to a state of rest in the following manner: 24 is an arm projecting from the yoke 23 and adapted to engage with an inclined cam 25, which is fixed upon the sleeve 16 in such position that as the sleeve 16 completes its revolution and brings the knife 20 back to its normal position the cam 25, engaging the arm 24, will force the sleeve 16 back and the teeth out of engagement with the teeth 18, by which it was revolved. The sleeve 16 has a grooved or flattened portion 33, and at the instant when the knife arrives at the point where it should come to a state of rest a spring 26, which projects from the yoke 23, presses upon this flattened portion 33 of the sleeve or drops into the groove, and thus arrests it; but the pressure will be light enough so that when the sleeve is again engaged with the actuating-clutch it can be revolved and the latch disengaged. In this manner the beets are deprived of their tops as fast as they arrive and are delivered upon their carrier.

The various driving mechanisms are here illustrated, but not further described, as variations in these mechanisms will be obvious to any one familiar with mechanism, and I do not desire to limit myself to any particular form.

Having thus described my invention, what I claim as new, and desire to secure by Letters Patent, is—

1. In a beet-harvester, the combination of endless traveling beet-carrier elements, and beet-top cutters disposed in the path of the beets carried by said carrier elements, substantially as described.

2. In a beet-harvester, the combination of means to uproot the beets, means to engage and carry the uprooted beets, and means to cut off the tops of the beets, to which top-cutting means the said carrying means convey the beets, substantially as described.

3. A beet-harvesting apparatus, consisting of a wheeled frame, a pair of plows supported therefrom with parallel adjacent landsides and moldboards to turn the earth outwardly from the row of beets, a blade extending between the rear ends of the landsides adapted to sever the tap-roots and lift the beets from the ground, carrying-belts for the beets and guide-rods between which the upper part of the beet passes and is transmitted to carrying-belts.

4. In a beet-harvesting apparatus, a wheeled frame, means for raising and lowering the frame upon its wheels and guiding the same, a pair of plows fixed to the frame having adjacent parallel landsides and moldboards adapted to turn the earth outwardly away from the row of beets, a cutting and lifting blade at the rear of the landsides and guides between which the beets are maintained upright as they pass rearwardly, a pair of endless traveling belts between which the beets are delivered from said guides, and a cutter revolving transversely to the line of travel and contiguous to the upper ends of the carrying-belts.

5. In an apparatus for harvesting beets, a wheeled frame with means for raising, lowering and steering, a pair of plows supported therefrom, with parallel adjacent landsides and outwardly-turning moldboards, a lifting and cutting blade at the rear of the landsides and guides between which the beets are transmitted rearwardly, a pair of endless traveling belts between which the beets are delivered, said belts having their transverse bars concaved toward each other to retain the beets in a central position, and elastic arms fixed with relation to the traveling belts and between which the beets are carried by the belt.

6. In a beet-harvesting apparatus, a wheeled and vertically-adjustable frame, with plows and lifting-blade by which the beets are extricated from the ground, adjustable endless belts between which the beets are delivered and by which they are carried upwardly and rearwardly, a cutter with means for intermittently rotating it transversely to the line of travel of the beets, and a stop against which each beet strikes as it arrives at the upper end of the carrying-belts, said stop acting to engage the mechanism by which the cutter is revolved.

7. In an apparatus for harvesting beets, plows, lifters and carrying-belts by which the beets are transmitted to the point where the tops are to be severed, a shaft having one member of a clutch fixed to and revoluble therewith, a second member turning loosely upon the shaft and carrying a cutter which is revoluble transversely to the line of travel of the beets, said clutch member being slidable upon the shaft, an arm carried by said member with which arm the beets come in contact as they reach the upper end of the carrying-belt, whereby the clutch members are engaged and the knife is revolved to sever the top of the beet.

8. In an apparatus for harvesting beets, means for extracting the beets from the ground and conveying them upwardly and rearwardly and presenting the tops in the line of travel, a revoluble shaft, one member of the clutch carried thereby, a sleeve carrying the second member of the clutch and loosely slidable upon the shaft, a knife carried by and revoluble with the sleeve, a stop also carried by the sleeve and forming a point of contact for the beet as it arrives in position to have the top severed whereby the clutch members are engaged and the knife revolved, a cam carried by the movable clutch member, and a fixed arm adapted to engage the cam and retract and disengage the clutch member after a single revolution of itself and the cutter.

9. In a beet-harvesting apparatus, a wheeled frame, plows carried thereby, a lifting-blade, guides and endless traveling belts by which the beets are successively transferred, a transversely and intermittently revoluble cutter by which the tops of the beets are severed when presented, an endless traveling and transversely-movable belt upon which the beets are received after the tops have been severed, and by which they are delivered at one side of the line of travel of the apparatus.

10. In a device for removing the tops from beets, a carrier by which the beets are transmitted, a cutter revoluble transversely to the line of travel of the beets, and means actuated by the movement of the beets whereby the cutter is revolved to sever the top of each beet.

11. In a device for removing the tops from beets, a carrier by which the beets are transmitted successively, a cutter revoluble periodically transversely to the line of travel of the beets, a stop with which the beets come in contact, and mechanism controlled by the stop and actuated by each contact whereby the knife is revolved and a top severed.

12. In a device for removing tops from beets, a traveling carrier for the beets, a cutter revoluble periodically and transversely, a clutch mechanism and a stop against which an approaching beet comes in contact, said stop engaging the clutch and causing a single revolution of the cutter.

13. In a device for removing the tops from beets, a traveling beet-carrier, a cutter revoluble transversely to the line of travel of the beets, a normally disengaged clutch member through which the cutter is actuated, a stop against which the beets come in contact and through which the clutch is engaged to revolve the cutter, and a cam and arm engaged thereby to disengage the clutch and stop the cutter after each revolution.

14. In a harvester of the character described, the combination with an unearthing device, of a cutter for severing the tops of the beets, and a beet-arighting device for delivering the beets and presenting their top ends to said cutter, substantially as described.

15. In combination with means for clearing earth from opposite sides of a row of beets, means to uproot the beets, a cutter for severing the tops of the beets, and means to convey the beets thereto, substantially as described.

16. The combination with means for clearing earth from opposite sides of a row of beets, of means to uproot the beets, a cutter for severing the beet-tops, and means for relatively moving the beets and said cutter that said cutter may sever the beet-tops, substantially as specified.

17. In a machine of the class described, the combination of means for separating vegetables from the earth, means located above the surface of the earth for cutting the tops off of the vegetables, and means for delivering said vegetables from said separating means to said cutting means, substantially as specified.

In witness whereof I have hereunto set my hand.

CHARLES L. JOLLY.

Witnesses:
  S. H. NOURSE,
  JESSIE C. BRODIE.